Patented Aug. 25, 1936

2,052,028

UNITED STATES PATENT OFFICE 2,052,028

EGG PRODUCT

Benjamin R. Harris and Marvin C. Reynolds, Chicago, Ill.

No Drawing. Application December 11, 1935, Serial No. 53,902

20 Claims. (Cl. 99—196)

Our invention relates to an improved egg material, together with the use of such a material.

The principal object of our invention is the provision of an egg material having improved properties as an emulsifying agent and general interface modifier.

Another object is the provision of an egg material particularly adapted in the preparation of a cake batter.

Other objects and features of the invention will be apparent from a consideration of the following detailed description.

We have discovered a new and improved egg material having new and improved colloidal and emulsifying properties which render it particularly well adapted as an emulsifying agent in many industries where egg yolk and similar emulsifying agents are customarily used. The material imparts many valuable properties to a cake batter and is particularly well suited for use in this capacity.

Generally speaking, whole mixed eggs contain approximately one-third of yolk and two-thirds of white. The yolk material contains about 50% of moisture and 50% of solids, and the white material contains approximately 12½% of solids, and the rest is moisture. The solid material of whole eggs is composed of various types of proteins having various properties, as well as lecithin material and fats. The white is composed of a complex albuminous substance with traces of sugar of less than ½%. The moisture in the whole egg is partially bound with the solids and is partially in a free state.

On freezing such ordinary mixed eggs and then thawing them out, clumping takes place, and a portion of the liquid oozes out and the egg material is changed in its colloidal properties.

In our prior application Serial No. 706,292, now Patent 2,026,631, filed January 11, 1935, we disclosed the use of certain hydrophillic lipins in egg material whereby improved and enhanced characteristics were imparted to the egg material, and the value of the egg material as an emulsifying agent for both edible and technical emulsions was improved. We also disclosed that the egg product treated with the hydrophillic lipin, when frozen and thawed, was still further improved in that the thawed product was more viscous and its properties generally enhanced for uses to which egg products are usually put.

We have now discovered that the products described in our prior application are still further improved by the conjoint use of hydrophillic lipins with the hydrophillic colloids such as vegetable gums. The conjoint use of the hydrophillic lipins and gums or other hydrophillic colloids results in marked advantages, as will be pointed out more in particular as the detailed description progresses. The character, amounts and manner of introduction of the hydrophillic lipins and hydrophillic colloids will also be pointed out in detail.

The hydrophillic lipins used according to our invention all contain free hydroxy groups and preferably are fatty acid esters of water soluble hydroxy substances such as glycerol, polyglycerols, sugars, sorbitol, mannitol, and other alcohol sugars and hydroxy carboxylic acids. The greater the number of hydroxy groups, the less is required in the egg mixture to produce the desired results. All of our hydrophillic lipins comprise a relatively high molecular weight lipophile radical and at least one hydrophillic unesterified hydroxyl group. The hydrophillic lipins in general are esters or ethers of water soluble polyhydroxy substances in which at least one hydroxy group of the water soluble polyhydroxy substance is unesterified.

Examples of hydrophillic lipins are as follows:

Example 1

100 pounds of fatty acids derived from cottonseed oil are heated with 50 pounds of glycerine with stirring at 220° C. for from two to three hours, preferably in a current of inert gas such as carbon dioxide, until the free fatty acids drop down to about ½% or are completely esterified. This product will be substantially the mono-fatty acid derivatives of glycerine. The excess of glycerine is drawn off from the product which is in the form of a supernatant layer and the product is further purified if desired.

Example 2

To produce a diglyceride, 125 pounds of the product of Example 1 are heated with 100 pounds of cottonseed oil fatty acids to 240° C. for about two to three hours in the absence of air until the free fatty acids drop to from ½% to 1%.

Example 3

400 pounds of corn oil are heated in an inert atmosphere or in a vacuum under reflux, with 100 pounds of glycerine and $\tfrac{8}{10}$ pound of sodium hydroxide. The temperature is brought up to 250° C. and kept at approximately this temperature for two hours. The mixture is allowed to stand in order to cool and to permit the excess glycerine to settle to a bottom layer. The excess glycerine is drawn off and the product may be further purified if desired.

Example 4

1200 pounds of glycerine are treated with 12 pounds of alkali, such as caustic soda, and the temperature is brought to 250° C. and heating continued for four to five hours, or more, between 250 and 260° C., preferably in the presence of an inert gas such as carbon dioxide or nitrogen. The resulting product of this reaction is a mixture of various polyglycerols which may be employed to produce polyglyceride products as will be shown in subsequent examples.

Example 5

100 pounds of the fatty acids of cottonseed oil are heated with agitation with 100 pounds of the reaction mixture of Example 4, for from two to three hours, at a temperature of 220° C. in the presence of an inert gas, the mixture is allowed to cool and to remain at rest, and the excess of the polyglycerol is drawn off from the product, which is in the form of a supernatant layer, and the product may be further purified by washing with brine or by other means. The resulting product of this reaction contains a large proportion of hydrophillic high molecular weight fatty acid esters of various polyglycerols, each containing at least one, preferably two or more, unesterified hydroxy groups.

Example 6

150 pounds of the reaction mixture of Example 5 is heated with 100 pounds of oleic acid at a temperature of about 220° C., for from two to three hours, until the free fatty acid content of the reaction mixture is reduced to ½% or 1%. The heating is done in the presence of an inert gas. The resulting product of this reaction mixture contains primarily the di-fatty acid esters of polyglycerols.

Example 7

We take 300 pounds of corn oil, and mix the same with 300 pounds of polyglycerol prepared as above, and $\frac{1}{10}$ of a pound of caustic soda. The mixture is heated for three hours at a temperature of approximately 260 to 265° C. in the absence of air. The material is allowed to settle after cooling and the excess of polyglycerol found to be present is drawn off. The resulting product is a thick, viscous oil, which, however, emulsifies very readily in water. The principal ingredients of this product are hydrophillic polyglycerol esters of the fatty acids of corn oil.

Examples of hydrophillic lipins which may be used in the present invention are as follows:

Monostearyl glycerol
Mono-palmitic acid ester of glycerol
Monocetyl ether of glycerol
Monomyristyl glycerol
Mono-lauryl glycerol
Mono-oleyl diglycerol
Mono-oleyl diethylene glycol
Mono-oleyl glycerol
1.6 di-lauryl diglycerol
Fatty acid derivatives of sugars and sugar alcohols with free OH groups
Fatty acid polyglycerides with free OH groups
The polyglycerol esters described in Harris application, Ser. No. 697,533 filed November 10, 1933
The modified tri-glyceride substance described in Harris application Ser. No. 697,534, filed November 10, 1933, now Patent No. 2,009,796
The hydroxy substances described in Harris Patent No. 1,917,257.

The characteristics of all of these examples are clear from the preceding description. They have this factor in common, in that all of them have a lipophile radical in the molecule, with one or more OH groups. The latter impart to the molecule a definite hydrophillic character, despite the presence of the fatty acid or other lipophile group, which imparts to the molecule a fatty or oily character. The molecule as a whole possesses both hydrophillic and lipophillic character.

Substances which may be used as a source of hydroxy groups are any water soluble polyhydroxy substances such as sorbitol, mannitol, sugars, etc., as well as glycerine, polyglycols, etc., more particularly referred to in the illustrative examples.

Substances which can be utilized as a source of lipophile radicals are lauric, myristic, palmitic, stearic, oleic, and other fatty acids derived from common oils and fats of commerce, including cottonseed oil, palm kernel oil, corn oil and other vegetable oils, lard, tallow and other animal oils and sardine oil, whale oil and other fish oils, as well as the corresponding alcohols.

All of the above described hydrophillic lipins are esters and ethers of high molecular weight lipophile radicals and water soluble polyhydroxy substances such as glycerine, polyglycerols, sugars, sugar alcohols, glycols, etc. In general, the more free hydroxy groups the substances contain in relation to the fatty acid or high molecular weight alkyl radical, the greater will be their hydrophillic properties and the less of such substances is required in the egg mixture to produce a certain result. Thus, for example, for the reaction mixture of Example 1, 7% to 10% is preferred in combination with eggs. If, however, the reaction mixture of Example 5 is used, which contains a predominant amount of mono-fatty acid esters of polyglycerols, about 3% to 4% is sufficient in the egg mixture to produce the desired hydrophillic properties and emulsion effect, as for instance, in cake batter. Larger percentages of hydrophillic lipins in combination with hydrophillic colloids may be used in connection with eggs used for baking or industrial purposes, such as shampoos, cosmetics, tanning and other industrial purposes.

As noted hereinabove, a satisfactory way of introducing the hydrophillic material is in paste form. Hydrophillic substances which are substantially liquid at ordinary room temperatures usually disperse readily in water, or other aqueous material, such as egg whites, or take up water to form a paste. Hydrophillic substances, solid at room temperature, are emulsified with water to form paste by a convenient method in which the paste is made at an elevated temperature, at which the hydrophillic lipin is liquid, and then allowed to cool while stirring is continued. In general, we prefer to use substances which are non-solid at ordinary room temperatures. As a rule, dispersion is facilitated, and in most cases grinding is not required to facilitate dispersion.

We have discovered that the addition of a vegetable gum, preferably in small proportions such as from .1% to .3% of the total mass, facilitates the introduction of hydrophillic lipins, such as mono-stearine or monopalmitin, or other hydrophillic materials which are hard and solid or plastic at room temperatures. The gums also aid in more uniform dispersion of the softer hydrophillic lipins, as described herein. The treated egg materials containing the hydrophillic lipins with the free OH groups change their physical properties when a greater or lesser amount of a gum is admixed therewith. Especially when the egg products are frozen and thawed, they are more homogeneous and uniform in consistency, without separation of layers. The products also possess a greater viscosity and a greater emulsifying value. The coaction of the small proportion of the hydrophillic colloid, such as a vegetable gum, with the relatively larger proportion of the hydrophillic lipin changes radically the colloidal properties of the egg magma before and after freezing.

For the convenience of those skilled in the art, we give below a more detailed description of the conjoint use of hydrophillic lipins and hydrophillic colloids, together with specific examples of such use.

150 parts of commercial monostearine are melted and 5 parts by weight of powdered gum tragacanth are admixed thoroughly. The hydrophillic lipin prevents lumping of the gum. 270 parts of hot water are then added gradually, with constant stirring, and the mixture is stirred while cooling until a paste is formed. This paste, containing the gum, may be combined with whites, whole eggs or yolks. In the case of whites, about 775 parts of the whites are gradually stirred into 126 parts of the paste, by adding first a small amount of egg whites to the paste, mixing thoroughly and then adding the remainder gradually. In the case of the egg yolk, a similar proportion of paste may be used, or a smaller proportion, if desired. When whole eggs are treated, 50 to 130 parts of the paste containing the hydrophillic lipin in the gum are admixed with the whole egg magma to produce a homogeneous mixture. It is necessary to mix the products thoroughly to obtain proper distribution of the constituents into the egg magma.

In place of monostearine, I can use the substances prepared as described in Examples 2 or 3, or any other mixture of mono- and/or diglycerides, and prepare a paste in combination with the gum and then combine it with egg material, mixing the mixture thoroughly so as to get a mixture of the eggs into the magma.

In the case of a liquid mono- and/or diglyceride, it is also possible to disperse the powdered gum in the liquid mono- and/or diglyceride or in the liquid mono- and/or dipolyglycerides of the examples shown and introduce the mixture into the egg material without first making a paste.

We can also prepare a paste by using the polyglycerides as prepared in Examples 5, 6 or 7, or polyglycerides prepared from fatty acids which are solid at room temperature or mixtures of various polyglycerides varying in their melting points. In the case of a polyglyceride which is solid at room temperature, the polyglyceride is melted first, the gum introduced therein in the powdered condition, and then warm water added in a sufficient proportion to make a paste, cooling while stirring. A suitable proportion of this paste is then combined with either whites, yolks, whole eggs or a mixture of various proportions of yolks and whites.

We have found in practice that a hydrophillic lipin paste containing 150 parts of hydrophillic lipin in the form of a polyglyceride, 5 parts of gum tragacanth and 270 to 300 parts of water will make a good paste and a suitable quantity of this paste may be co-mingled and introduced into egg material. We do not limit our invention to the specific manner of making the paste or to the specific amount of the hydrophillic lipin used. Thus, for example, if the hydrophillic lipin is liquid at ordinary room temperature the gum may be dispersed in the hydrophillic lipin with stirring and then comingled properly with egg material.

The vegetable gum material used not only aids in the introduction of the hydrophillic lipin into the eggs but also effects a better dispersion of the hydrophillic lipin, especialy if the hydrophillic lipin is solid at ordinary temperatures. It also changes the entire physical properties of the egg mixture. Thus, for example, in the case of egg whites, the presence of gum reduces the separation of layers in the egg material before freezing and especially after freezing and thawing. The gum effects a more uniform distribution and a greater effectiveness of the hydrophillic lipin in the egg magma, especially after freezing and thawing. The colloidal properties of the gum in combination with the hydrophillic lipin affect the colloidal properties of the entire egg mixture, especially the equilibrium of moisture which is present in the egg in the free and bound state.

The resultant egg products may be used for baking purposes and in the preparation of various other edible emulsions as well as for technical emulsions such as cosmetics and other industrial emulsions containing oils and fats, as in tanning processes.

Any suitable hydrophillic colloid may be used, but preferably vegetable gums, such as gum tragacanth, karaya, gum arabic, pectin, agar agar, and Irish moss, or other hydrophillic colloids, such as gelatin or gelatinized starch. Some modification in the manner of introducing the hydrophillic colloid may be necessary, depending upon its characteristics. For example, Irish moss should be heated to a sufficiently high temperature to produce a gelatinous condition, as those skilled in the art will understand. Those gums such as tragacanth, which are obtainable in a powdered condition, may be introduced directly without preliminary treatment, in accordance with the examples given.

The proportion and character of the hydrophillic lipin substance employed in the preceding examples is purely illustrative, as the proportion may be modified within relatively wide limitations without departing from the spirit and scope of our invention. The proportion of substances employed is determined very largely by the enhancement and emulsifying properties desired, the degree to which the character of the egg material is modified, the purpose for which the egg material is to be used, the amount of egg material to be used, and other factors. The polyglycerides or other hydrophillic lipins of our invention may be incorporated in egg whites, in egg material consisting essentially of yolks, or in mixtures of whites and yolks in the proportions occurring in whole eggs, or in other proportions. After the addition of the hydrophillic lipin to the egg material with or without other improving or modifying substances, the egg material can be employed directly or it may be frozen and maintained in a frozen condition until ready for use.

When the substances of our invention are added to egg material consisting essentially of egg yolks, the viscosity of the yolk material, in general, is increased. This increase of viscosity is more marked when the product has been frozen and thawed. The utilization of the polyglyceride substances has a marked effect in preventing separation of moisture from the egg material after it has been frozen or thawed.

Whole eggs are improved by the addition thereto of the substances of our invention. We may prepare other mixtures of whites and yolks, as, for example, products prepared by adding whites to a whole egg mixture, or products prepared by adding to yolk material whole egg mixtures. Such mixtures may be employed without freezing or they may be frozen and maintained at a temperature below the temperature of decomposition until ready for use.

In addition to the hydrophillic lipins and hydrophillic colloids described hereinabove, we may also incorporate with egg material, prepared in accordance with our invention, suitable proportions of any materials employed in the treatment or preparation of egg materials, either intended for freezing or intended to be used without freezing. The additional treating materials employed may be viscosity modifying agents, preserving agents, flavoring agents, or substances having a combination of these functions, as, for example, ordinary salt. Other examples of treating agents which may be employed are cane sugar, dextrose, glycerine, or other suitable material. Edible acids may also be employed, as, for example, tartaric or citric acids, in proportions of approximately $\frac{1}{10}\%$. The use of any of these additional treating agents of the character identified immediately hereinabove results in a further modification in the properties and characteristics of the egg product, producing a product somewhat different in each instance from the same product without such additional treating materials.

As an example of further advantages of the use of the hydrophillic gums in our products, we have found that in some instances a product consisting solely of egg material and hydrophillic lipins is apt to lack, in a small degree, a certain desired homogeneity, especially after freezing and thawing. This is especially true of whites, and, though it does not interfere with the effectiveness of the composition, for example, in baking, it is desirable from the standpoint of general appearance to have as complete homogeneity as possible. We have found that a very effective way of accomplishing this result is to incorporate a small proportion, from $\frac{1}{10}\%$ to $\frac{1}{2}\%$ or $\frac{3}{4}\%$ of a hydrophillic material of the class exemplified by the illustrations given hereinabove, although larger proportions may also be used in many cases. The hydrophillic gums are very satisfactory for this purpose. In general, it is convenient to disperse the hydrophillic gum or other hydrophillic colloid in warm, hot, or boiling water, and then use this hot dispersion to form a paste of our polyglycerides with hydroxy groups or other hydrophillic lipins in the manner referred to in preceding examples; or alternatively a finely divided carbohydrate colloid may be first coated with our hydrophillic lipins and subsequently dispersed in warm or hot water to form the desired paste. An illustrative example for carrying out this form of the invention is as follows:

To 30 parts of a polyglycerol derivative comprising essentially mono-stearic acid ester of polyglycerol (average molecular weight of a diglycerol), maintained in a molten or viscous condition, one part of finely powdered gum tragacanth of good grade is added with stirring. To this mixture, with continuous agitation, 19 parts of water, previously warmed to prevent chilling of the polyglyceride, are added gradually, with constant stirring. The mixture is allowed to cool to room temperature and stirring is continued until the product has reached approximate room temperature. A substantially white paste of somewhat firm consistency is thus obtained. To 50 parts of the paste so prepared, 60 parts of egg whites are then gradually added, while mixing in a slow speed mixer, mixing being continued for about one-half hour at moderate speed after all of the egg whites have been incorporated. 210 parts of additional egg whites are then added, and the mixing continued for another three-quarters of a minute. The product consists of 320 parts of an improved egg white composition suitable for use in accordance with our invention and adapted to be frozen and kept in cold storage and thawed out when ready for use. A similar method may be employed with whole eggs or a product consisting essentially of egg yolks.

The egg materials prepared in accordance with our invention may be frozen and maintained in a frozen condition for long periods of time without spoilage and without impairing the colloidal and emulsifying properties of the product. For some purposes, the product is improved by the freezing treatment. In freezing, temperatures ordinarily employed in cold storage warehouses may be utilized. Such temperatures are, for example, from $+5$ to $-10°$ F., depending upon the nature of the egg product. When ready for use, the product is thawed by allowing it to stand in a room at ordinary temperature.

The egg product produced in accordance with our invention has a relatively large number of applications. One use is in cake baking. In using our improved egg compositions, whether in a frozen or non-frozen condition, in preparing a cake batter, they offer certain advantages in that a cake batter may be produced with a larger proportion of moisture such as milk and a correspondingly larger proportion of sugar than usually used in a cake batter (without using more egg yolk), without impairing the volume of the cake, and with a decided improvement in the tenderness and general texture characteristics of the cake. Also by virtue of the additional moisture content and of the colloidal condition of the moisture, such cake has considerably enhanced resistance to staling.

The egg material of our invention has many other advantages in that when frozen and thawed, it is a smooth mass with increased viscosity, with improved emulsifying value. Whether used before freezing or after freezing, in a cake batter, it makes an improved smooth cake batter; it enhances the emulsification and dispersion of the other ingredients used in the cake batter.

With the treated eggs of our invention, it is possible to produce a more tender cake with longer keeping qualities by increasing the liquids in the formula, as well as the sugar. From 30% to 60% more liquids such as milk and eggs may be used and from 10% to 35% more sugar than usually is used in commercial practice. It also makes possible the use of the ordinary creaming method where the ordinary shortening such as partially hydrogenated cottonseed oil is creamed together with the sugar to incorporate a certain amount of air before the other ingredients are added.

In view of the fact that a larger proportion of sugar and liquids, such as milk, is used, it is necessary to add additional baking powder to affect the additional mass of the batter, especially when increase of liquids and sugars is very high. But this increase in baking powder is not as large as if the lipin were added to the shortening and the regular blending method is used, in which flour and shortening are first blended, then other ingredients added, the liquid constituent being added towards the end.

The usual hydrophillic lipin, introduced in a shortening such as partially hydrogenated cottonseed oil of 100 to 102° F. melting point, reduces considerably the smoking point of the shortening, and for this reason while it is suitable for baking purposes, it is not suitable for deep frying of such a product as doughnuts, and the baker usually needs two types of shortening. If, however, the egg product of our invention is used in baking, the ordinary hydrogenated shortening may be used, which is suitable for both baking and frying purposes.

As previously noted, the product of our invention may be used in many foods, such as cake batters, where fatty constituents such as animal or vegetable oil are used in aqueous dispersion. The colloidal properties of our treated egg material, however, make it suitable for many other technical purposes where emulsification is important. Thus it may be used as a base to emulsify oil, fats, sulphonated oils, etc., used in the leather industry and many other industries. The product may also be used in cosmetics in combination with olive oil and sulphonated oil, for example, together with antiseptics and other usual ingredients.

What we claim as new and desire to protect by Letters Patent of the United States is:

1. A composition consisting essentially of egg material, a proportion of a hydrophillic colloid, and a proportion of a hydrophillic lipin, said hydrophillic lipin comprising a derivative of a polyhydroxy substance having a lipophile radical and at least one unesterified hydroxy group in the polyhydric nucleus.

2. A composition consisting esentially of egg yolks, a proportion of a hydrophillic colloid, and a proportion of a hydrophillic lipin, said hydrophillic lipin comprising a derivative of a polyhydroxy substance having a lipophile radical and at least one unesterified hydroxy group in the polyhydric nucleus.

3. A composition consisting essentially of egg whites, a proportion of a hydrophillic colloid, and a proportion of a hydrophillic lipin, said hydrophillic lipin comprising a derivative of a polyhydroxy substance having a lipophile radical and at least one unesterifield hydroxy group in the polyhydric nucleus.

4. A composition consisting essentially of egg material, a proportion of a hydrophillic colloid in the form of a vegetable gum, and a proportion of a hydrophillic lipin, said hydrophillic lipin comprising a derivative of a polyhydroxy substance having a lipophile radical and at least one unesterified hydroxy group in the polyhydric nucleus.

5. A composition consisting essentially of egg material, a proportion of a hydrophillic colloid, and a proportion of a hydrophillic lipin, said hydrophillic lipin comprising a derivative of a polyhydric alcohol having a lipophile radical and at least one unesterified hydroxy group in the polyhydric nucleus.

6. A composition consisting essentially of egg material, a proportion of a hydrophillic colloid, and a proportion of a higher fatty acid ester of a polyhydroxy substance wherein said ester has at least one unesterified hydroxy group in the polyhydric nucleus.

7. A composition consisting essentially of egg material, a proportion of a hydrophillic colloid, and a proportion of a higher fatty acid ester of a polyhydric alcohol wherein said ester has at least one unesterified hydroxy group in the nucleus of the polyhydric alcohol.

8. A composition consisting essentially of egg material, a proportion of a hydrophillic colloid, and a proportion of a higher fatty acid ester of glycerol wherein said ester has at least one unesterified glycerol hydroxy group.

9. A composition consisting esentially of egg material, a proportion of a hydrophillic colloid, and a proportion of a higher fatty acid ester of polyglycerol wherein said ester has at least one unesterified polyglycerol hydroxy group.

10. A composition consisting essentially of egg material, a proportion of a hydrophillic colloid in the form of a vegetable gum, and a proportion of a higher fatty acid ester of a polyhydric alcohol wherein the ester has at least two unesterified hydroxy groups in the nucleus of the polyhydric alcohol.

11. A frozen egg product consisting essentially of egg material, a proportion of a hydrophillic colloid, and a proportion of a hydrophillic lipin, said hydrophillic lipin comprising a derivative of a polyhydroxy substance having a lipophile radical and at least one unesterified hydroxy group in the polyhydric nucleus, said product being frozen and kept in a frozen condition until ready for use.

12. A frozen egg product consisting essentially of egg material, a proportion of a hydrophillic colloid, and a proportion of a higher fatty acid ester of a polyhydroxy substance wherein said ester has at least one unesterified hydroxy group in the polyhydric nucleus, said product being frozen and kept in a frozen condition until ready for use.

13. A frozen egg product consisting essentially of egg material, a proportion of a hydrophillic colloid, and a proportion of a higher fatty acid ester of a polyhydric alcohol wherein said ester has at least one unesterified hydroxy group in the nucleus of the polyhydric alcohol, said product being frozen and kept in a frozen condition until ready for use.

14. A frozen egg product consisting essentially of egg material, a proportion of a hydrophillic colloid, and a proportion of a higher fatty acid ester of glycerol wherein said ester has at least one unesterified glycerol hydroxy group, said product being frozen and kept in a frozen condition until ready for use.

15. A frozen egg product consisting essentially of egg material, a proportion of a hydrophillic colloid, and a proportion of a higher fatty acid ester of polyglycerol wherein said ester has at least one unesterified polyglycerol hydroxy group, said product being frozen and kept in a frozen condition until ready for use.

16. A frozen egg product consisting essentially of egg material, a proportion of a vegetable gum, and a proportion of a higher fatty acid ester of a polyhydric alcohol wherein the ester has at least two unesterified hydroxy groups in the nucleus of the polyhydric alcohol, said product being frozen and kept in a frozen condition until ready for use.

17. The method of producing an improved egg product which comprises incorporating with egg material an intimate mixture comprising a hydrophillic colloid and a hydrophillic lipin.

18. The method of producing an improved egg product which comprises incorporating with egg material an intimate mixture comprising a hydrophillic colloid and a hydrophillic lipin, and freezing the resulting intimate mixture.

19. The method of producing an improved egg product which comprises dispersing in a hydrophillic lipin, while in a liquid condition, a proportion of a hydrophillic colloid in the form of a vegetable gum in powdered condition, incorporating an aqueous liquid therewith to form a paste, and dispersing a proportion of the resulting paste into an egg product of a class consisting of egg yolks, egg whites, and mixtures of yolks and whites.

20. The method of producing an improved egg product which comprises dispersing in a hydrophillic lipin, while in a liquid condition, a proportion of a hydrophillic colloid in the form of a vegetable gum in powdered condition, incorporating an aqueous liquid therewith to form a paste, and dispersing a proportion of the resulting paste into an egg product of a class consisting of egg yolks, egg whites, and mixtures of yolks and whites, and freezing the resulting product.

BENJAMIN R. HARRIS.
MARVIN C. REYNOLDS.